United States Patent [19]
Wagner

[11] Patent Number: 5,302,179
[45] Date of Patent: Apr. 12, 1994

[54] METHOD AND APPARATUS FOR PRODUCING USEFUL SOIL PRODUCTS FROM WASTE PRODUCTS

[75] Inventor: Larry R. Wagner, Chattanooga, Tenn.

[73] Assignee: Astec Industries, Inc., Chattanooga, Tenn.

[21] Appl. No.: 757,827

[22] Filed: Sep. 11, 1991

[51] Int. Cl.$^5$ .................. C05F 7/00; A01G 11/00
[52] U.S. Cl. .............................. 71/13; 71/12; 71/903; 47/1.42; 588/249; 210/610; 210/770
[58] Field of Search .................. 71/12, 13, 903; 47/1.42; 405/128, 129, 263; 588/249; 210/609, 610, 770; 435/262, 262.5

[56] References Cited

U.S. PATENT DOCUMENTS

| | | | |
|---|---|---|---|
| 3,824,092 | 7/1974 | Wikstrom | 71/12 |
| 3,932,166 | 1/1976 | Vignovich et al. | 71/11 |
| 4,881,475 | 11/1989 | De Leur | 110/346 |
| 4,951,417 | 8/1990 | Gerken et al. | 47/1.42 |

FOREIGN PATENT DOCUMENTS 0000195  1/1979  European Pat. Off. ............... 71/12

OTHER PUBLICATIONS

Soil Remediation Technology, SRC Registers Company Name, p. 3. [No Date].
Astec Product Bulletin, Astec Industries Inc, "Soil Purification System", 16 pages [No Date].
ES & T, vol. 22, #12, 1986, pp. 1411-1414, "Enhancement of Pentachlorophenol Degradation . . . Sewage Sludge".

*Primary Examiner*—Ferris Lander
*Attorney, Agent, or Firm*—Nilles & Nilles

[57] ABSTRACT

A method and apparatus for producing a useful soil product from contaminated soil and sludge is disclosed, and wherein the contaminated soil is heated in a primary treatment unit to a temperature above the vaporization temperature but below the auto ignition temperature of the contaminates, so as to volatilize the contaminates. The volatilized contaminates are then delivered to a secondary treatment unit where they are heated to a temperature sufficient to be converted to non-toxic products, such as carbon dioxide and water. The hot purified soil produced in the primary treatment unit is conveyed to a mixing chamber, and sedimentary sludge is also conveyed to the mixing chamber, and during mixing, heat energy is transferred to the sludge so as to heat and substantially sterilize the sludge, and to thereby produce a useful soil product.

10 Claims, 1 Drawing Sheet

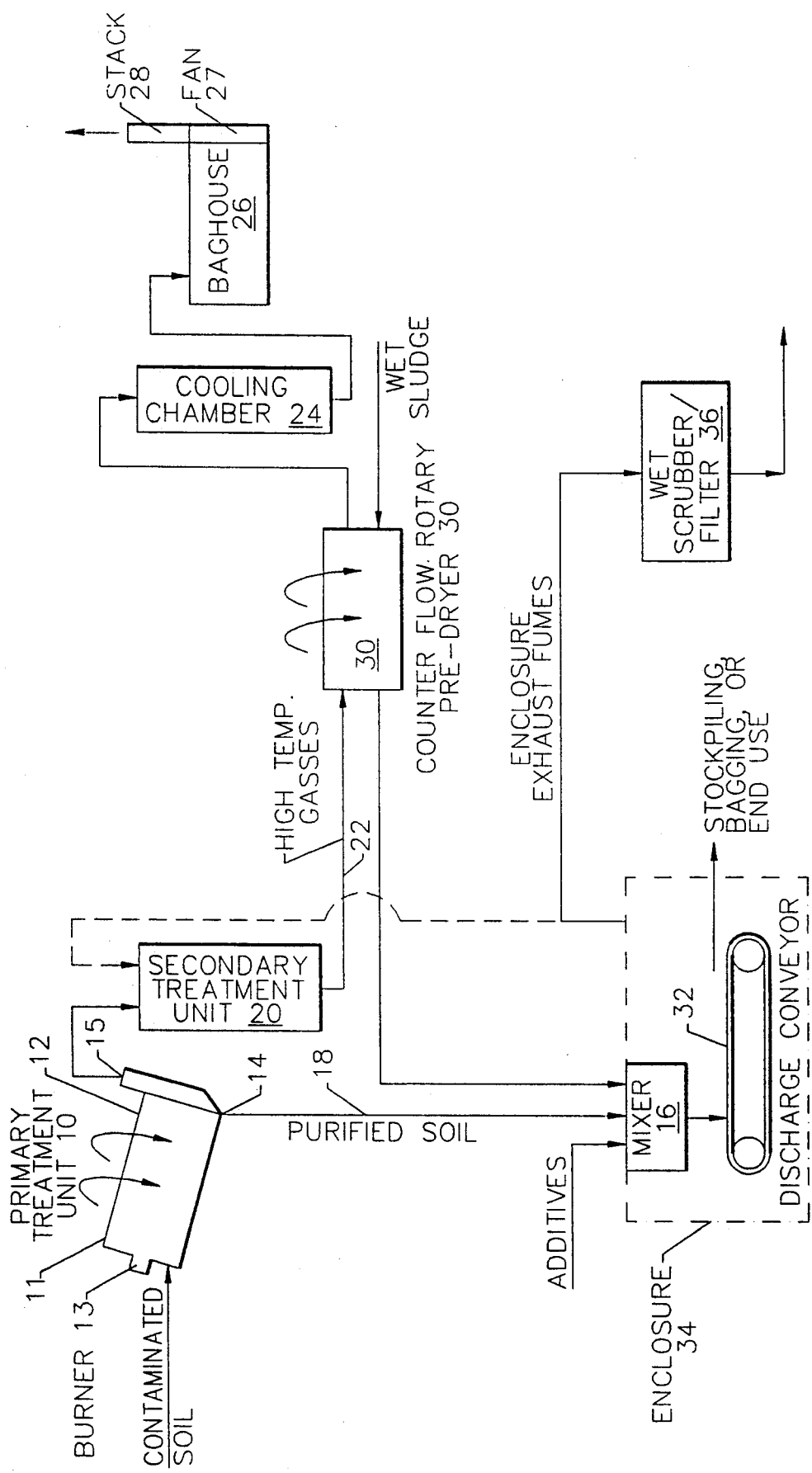

METHOD AND APPARATUS FOR PRODUCING USEFUL SOIL PRODUCTS FROM WASTE PRODUCTS

BACKGROUND OF THE INVENTION

The present invention relates to a method and apparatus for producing a useful soil product from waste products, such as petroleum contaminated soil and sedimentary sludge.

The effective cleanup and disposal of soils which are contaminated with petroleum products and other contaminants have recently become major environmental concerns. As one specific example of the problem, a large number of underground fuel tanks have been found to be leaking and releasing a variety of contaminants into the surrounding soil, and as these tanks are being removed and repaired pursuant to environmental regulations, the volume of contaminated soil has been growing. Many communities no longer permit such soil to be placed in landfills, and thus a need exists for the decontamination of the soils.

Co-pending U.S. patent application Ser. No. 07/565,945, now U.S. Pat. No. 5,176,445, discloses a prior soil decontamination apparatus wherein the soil is initially heated to a relatively low temperature in a rotary dryer so as to volatilize the contaminants, and the volatilized contaminants are then fed to a high temperature after burner which converts the volatile contaminants to non-toxic products which are then filtered and released to the atmosphere. This process also produces clean, purified soil at high temperatures, and this hot, dry soil must be cooled and moisture added before it can be safely handled without producing excessive dust. Since most organic matter has been removed from this soil, it will not support plant life, and it therefore is normally used as roadbase fill and cover for landfills where its infertile characteristics can be tolerated.

The effective disposal of sedimentary sludge produced by municipal sewage treatment systems also presents an environmental concern. Huge quantities of such sludge are produced by municipalities, for example, a municipality of 300,000 people produces about 75,000 to 80,000 wet tons per year. Filtering presses and other devices are used to reduce the moisture in such sludge to about 65%, but efforts to further reduce the moisture content, as by using heat to dry the sludge, have not been practical because of the cost, odor and air pollution.

Sedimentary sludge also contains many disease producing organisms, and the potential exists for these organisms to be spread by a sludge which has not been pasteurized or sterilized. Such treatment is not normally cost effective, and therefore, it is common for sludge to be simply placed in land fills without treatment.

It is accordingly, an object of the present invention to provide a method and apparatus for effectively and economically decontaminating petroleum contaminated soils and the like.

It is another object of the present invention to provide a method and apparatus for the effective and economical use of sedimentary sludge.

It is a further object of the present invention to provide a method and apparatus for effectively decontaminating contaminated soil, while concurrently sterilizing sedimentary sludge, and which utilizes the products of each process to promote the efficiency of the overall process, and which produces a useful soil product.

SUMMARY OF THE PRESENT INVENTION

The above and other objects and advantages of the present invention are achieved in the embodiment illustrated herein by the provision of a method and apparatus which involves heating the contaminated soil, and then mixing the heated soil with sedimentary sludge, and with the quantity and temperature of the heated soil being such as to heat and substantially sterilize the sludge. More particularly, the contaminated soil is heated in a primary treatment unit by contacting the soil with heated gases and so that the soil is heated to a temperature below the auto ignition temperature of the contaminants and so as to volatilize the contaminants and produce hot purified soil. The volatilized contaminants are conveyed to a secondary treatment unit or afterburner, where they are heated to a temperature sufficient to effectively oxide the volatilized contaminants and form non-toxic hot gaseous products. The hot purified soil is conveyed to a mixing chamber, along with sedimentary sludge, and the hot purified soil and sedimentary sludge are mixed in the mixing chamber. The resulting soil product can be bagged and used as a potting soil, or it can be spread on lawns or farm land.

To increase the proportion of sludge which can be processed, the sludge preferably is predried at relatively low temperatures in a separate dryer, before being conveyed to the mixing chamber. One preferred method of predrying the sludge is to add a heat exchanger downstream of the secondary treatment unit, and so that the heat of the hot gaseous products from the secondary treatment unit is transferred to the sludge to preheat and partially dry the same.

From the above, it will be apparent that in accordance with the present invention, the soil decontamination process, and the sludge treatment process, combine to produce a synergistic result, in that the hot, dry decontaminated soil is cooled and the dust is controlled by the excess water in the sludge. Also, the sludge is subjected to a heat treatment from the hot decontaminated soil so as to remove the harmful bacteria as well as removing the excess water. Further, a useful soil product is produced from these previously waste materials.

BRIEF DESCRIPTION OF THE DRAWING

Some of the objects and advantages of the present invention having been stated, others will appear when considered in conjunction with the accompanying drawing, which is a schematic representation of an apparatus in accordance with the present invention.

DETAILED DESCRIPTION OF THE PREFERRED EMBODIMENT

Referring more particularly to the drawing, v the illustrated apparatus includes a primary treatment unit 10 which may, for example, be a conventional gas fired rotary drum dryer of the type disclosed in U.S. Pat. Nos. 4,638,747 and 4,211,490. The drum dryers as disclosed in the above patents and the present drawing are parallel flow dryers, wherein the material to be processed and the heated gases flow in the same direction. However, a counterflow dryer, such as disclosed in U.S. Pat. No. 4,867,572 may also be utilized with the present invention. The disclosures of these three prior U.S. patents are expressly incorporated herein by reference.

As more particularly described in the cited patents, the primary treatment unit 10 comprises a drum dryer which is mounted for rotation about a rotational axis which is somewhat inclined from the horizontal, and so as to define an upper end 11 and a lower end 12. A conventional burner 13, which is fueled for example by natural gas, propane, or fuel oil, and which includes a suitable blower, is positioned at the upper end of the drum mixer and so as to deliver heated air into the interior of the mixer. The material to be processed, such as oil contaminated soil, is introduced into an inlet at the upper end 11. Also, an outlet 14 for the processed material is provided adjacent the lower end 12. A further outlet 15 adjacent the lower end is provided for the removal of gases from the interior of the drum. As is conventional, the interior of the drum includes a series of vanes or flights (not shown) which serve to lift and cascade the material through the interior of the drum as the drum rotates, and so as to cause the material to move in a helical path from the inlet toward the outlet.

A mixing chamber 16 is operatively connected to the outlet via a duct 18 so as to receive the heated material from the outlet 14, and a secondary treatment 20 unit or afterburner is operatively connected to the outlet 15. The afterburner is of conventional design and includes a burner for heating the airstream passing therethrough to a temperature sufficient to effectively oxidize the vaporized contaminants therein. An air duct 22 is provided for conveying the hot gasses from the afterburner to a conventional cooling chamber 24, wherein the gasses are cooled by means of a water spray, and then conveyed to a conventional baghouse 26. Alternatively, the cooling chamber may take the form of an air to air cooling chamber wherein the gasses are cooled by outside air. An exhaust fan 27 pulls air through the baghouse and from the afterburner and drum dryer, so that any dust is filtered during passage through the baghouse. The cleaned air is then exhausted to the atmosphere through a stack 28.

In accordance with the present invention, means are also provided for delivering a second material, and particularly a sedimentary sludge produced by a municipal sewage treatment process, to the mixing chamber 16. Such sludge typically has a moisture content of at least about 65% by weight, although new technology may be able to reduce it to about 40-50%. In one embodiment, a conventional feed hopper (not shown) is provided for the sludge, and a conveyor feeds the sludge from the feed hopper into the mixing chamber at the same location where the hot purified soil enters from the drum dryer. If the moisture content of the sludge is very high, as where no filter press is utilized, the sludge may be pumped to the mixing chamber.

In another embodiment, and as illustrated in the drawing, means are provided for preheating the sludge prior to its being delivered to the mixing chamber 16. The preheating means comprises a heat exchanger 30 operatively connected to the air duct 22 immediately downstream of the afterburner 20, for transferring heat energy from the airstream passing through the air duct 22 to the sludge. As illustrated in the drawing, the heat exchanges 30 may take the form of a counterflow rotary drum dryer, wherein the hot gasses pass through the rotating dryer in one direction and the wet sludge passes through the dryer in the opposite direction.

The mixing chamber 16 preferably comprises a continuous twin shaft pugmill of conventional design, with the materials entering at one end and being discharged from the other end. The trough of the pugmill may be provided with supplemental heat by means of a circulating fluid, if desired, and the pugmill is sized for the required capacity and retention time of the materials to properly mix and treat the same.

The product discharged from the mixing chamber 16 is delivered onto a discharge conveyor 32, which provides additional retention time to complete the sterilization of the sludge. The conveyor discharges the resulting product into a pile or a bin where it can continue to soak at elevated temperature, if desired. The product may then be conveyed to a bagging operation, or directly to an end use.

The mixing chamber 16 and the discharge conveyor 32 are preferably enclosed by an enclosure 34 so that any steam and fumes released can be collected and treated. As indicated in the drawing, the collected fumes can be run through a small wet scrubber 36, the waste water from which can be mixed with the product discharged from the mixing chamber. Alternatively, the collected fumes can be mixed with the exhaust of the drum dryer and processed in the afterburner 20, since some of the gases released from the sludge, such as ammonia, will have a beneficial effect in reducing NOx in the afterburner.

The operation of the apparatus will now be described in further detail. The contaminated soil is conveyed from stockpiles into the drum dryer 10, where it is heated to a temperature ranging between about 450° to 750° F. which is a temperature above the vaporization temperature of the contaminants but below the auto ignition temperature thereof. As a result, the contaminants are separated from the soil and vaporized. The decontaminated or purified soil is removed through the outlet 14 and passes along the duct 18 to the mixing chamber 16. The vaporized contaminates and the products of combustion from the drum dryer 10 are conveyed into the afterburner 20 and the vaporized contaminates are therein reduced by high temperature oxidation. More particularly, the afterburner provides an energy input sufficient to achieve a temperature which ranges from about 1200° to 1800° F., depending on the type of the contaminates being treated. This temperature is held for a sufficient time so that the volatilized contaminates are converted by high temperature oxidation to carbon dioxide, water and other inert products. The air stream then passes through the heat exchanger 30, where it is cooled by contact with the wet sludge, and the air stream is then conveyed through the cooling chamber 24 which further reduces the temperature of the air stream, and finally to the baghouse 26.

The wet sludge is conveyed into the heat exchanger 30, where it is partially dried and heated, and it is then conveyed to the mixing chamber. The retention time of the materials in the mixing chamber, and their proportions, are predetermined such that the quantity and temperature of the hot purified soil from the drum dryer is sufficient to heat and substantially sterilize the sludge. In this regard, the soil is typically heated to a temperature of between about 450° to 750° F. in the drum dryer.

The temperature and physical characteristics of the product discharged from the mixing chamber can be controlled by varying the feed rates, and by adding additional water or other additives to the mixing chamber. If the temperature of the discharged product is very high, so as to unduly dry the mixture, additional water can be added to cool the mixture, reduce dusting, and make it easier to handle.

As indicated above, the reasonable end uses of the final product depend on its analysis, which will vary with the sources of the decontaminated soil and sludge, and their proportions. Typically, the product can be bagged and used as a potting soil, or it can be spread on lawns and farm land. Bentonite can be added to the mixing chamber to provide sealing characteristics to the product, and so that it can be used as a liner or final cap for waste disposal areas. Other ingredients can of course be added to modify the physical characteristics of the final product.

While the present invention is particularly suitable for decontaminating oil contaminated soil, the process can be used with uncontaminated soil to enrich the soil, while drying and sterilizing the sludge.

In the drawings and specification, there has been set forth a preferred embodiment of the invention, and although specific terms are employed, they are used in a generic and descriptive sense only and not for purposes of limitation.

That which is claimed is:

1. A method for enriching soil and comprising the steps of heating the soil in a primary treatment unit, and mixing the heated soil with sedimentary sludge produced by a sewage treatment process, with the quantity and temperature of the heated soil being such as to heat and substantially sterilize in the sludge and with the quantity and water content of the sludge being such as to cool the heated soil and to reduce the amount of dust in the heated soil.

2. The method as defined in claim 1 wherein the soil is heated to a temperature of between about 450° to 750° F.

3. A method of producing a useful soil product from waste products, and comprising the steps of heating contaminated soil in a primary treatment unit by contacting the soil with heated gasses and so that the soil is heated to a temperature below the auto ignition temperature of the contaminants and so as to volatilize the contaminants and produce hot purified soil, conveying the hot purified soil to a mixing chamber, conveying the volatilized contaminants to a secondary treatment unit and heating the volatilized contaminants therein to a temperature sufficient to effectively oxidize the volatilized contaminants and form non-toxic hot gaseous products, conveying sedimentary sludge produced by a sewage treatment process to the mixing chamber, and mixing the hot purified soil and sedimentary sludge in the mixing chamber, with the quantity and temperature of the hot purified soil being sufficient to heat and substantially sterilize the sludge, and with the quantity and water content of the sludge being such as to cool the heated soil and to reduce the amount of dust in the heated soil, to thereby produce a useful soil product.

4. The method as defined in claim 3 wherein the method includes the further steps of passing the non-toxic hot gaseous products and the sedimentary sludge through a heat exchanger so as to pre-heat and partially dry the sludge and cool the gaseous products, and then conveying the pre-heated and partially dried sludge to said mixing chamber.

5. The method as defined in claim 4 wherein the sedimentary sludge has an initial water content of at least about 65% by weight, and comprising the further steps of conveying the non-toxic hot gaseous products from the heat exchanger through a cooling chamber to further reduce their temperature, and then through a baghouse wherein the gaseous products are filtered and then released to the atmosphere.

6. The method as defined in claim 3 wherein the step of heating the contaminated soil in said primary treatment unit includes heating the same to a temperature of between about 450° to 750°F.

7. The method as defined in claim 6 wherein the step of heating the volatilized contaminants in said secondary treatment unit includes heating the same to a temperature of between about 1200° to 1800° F.

8. The method as defined in claim 3 comprising the further step of collecting any fumes generated in said mixing chamber, filtering the collected fumes, and then releasing the collected and filtered fumes to the atmosphere.

9. The method as defined in claim 3 comprising the further step of collecting any fumes generated in said mixing chamber, and conveying the collected fumes to said secondary treatment unit so as to heat and oxidize the fumes along with the volatilized contaminants from the primary treatment unit.

10. The method as defined in claim 3 comprising the further step of conveying bentonite to the mixing chamber and so that the bentonite is mixed with the purified soil and the sludge in the mixing chamber.

* * * * *